US010964096B2

(12) United States Patent
Sténson et al.

(10) Patent No.: US 10,964,096 B2
(45) Date of Patent: Mar. 30, 2021

(54) METHODS FOR DETECTING IF AN OBJECT IS VISIBLE

(71) Applicant: ADVERTY AB, Stockholm (SE)

(72) Inventors: Carl Sténson, Älvsjö (SE); Emilio Lando, Kista (SE)

(73) Assignee: ADVERTY AB, Stockholm (SE)

( * ) Notice: Subject to any disclaimer, the term of this patent is extended or adjusted under 35 U.S.C. 154(b) by 0 days.

(21) Appl. No.: 16/583,860

(22) Filed: Sep. 26, 2019

(65) Prior Publication Data
US 2020/0105049 A1    Apr. 2, 2020

(30) Foreign Application Priority Data
Sep. 27, 2018 (SE) .................................... 1851157-6

(51) Int. Cl.
*G06T 15/20* (2011.01)
*G06T 7/90* (2017.01)
*G06T 11/00* (2006.01)
(52) U.S. Cl.
CPC ............... *G06T 15/20* (2013.01); *G06T 7/90* (2017.01); *G06T 11/001* (2013.01)

(58) Field of Classification Search
None
See application file for complete search history.

(56) References Cited

U.S. PATENT DOCUMENTS

| 6,646,763 B1 * | 11/2003 | Estrada | G06K 15/02 |
| | | | 358/1.6 |
| 2008/0273202 A1 * | 11/2008 | Noy | G01N 21/25 |
| | | | 356/408 |
| 2009/0219379 A1 * | 9/2009 | Rossato | G06T 7/194 |
| | | | 348/14.01 |

* cited by examiner

*Primary Examiner* — Matthew Salvucci
(74) *Attorney, Agent, or Firm* — Tucker Ellis LLP

(57) ABSTRACT

A method for determining if an object in a colour three-dimensional environment rendered in real time on a display by a computer is visible for user with a defined point of observation in the three-dimensional environment. The object is defined by at least one area with a predefined colour $(C_D)$ where said area is rendered with a colour $(C_R)$ that is different from the predefined colour due to the rendering conditions at a defined time point. There is a pre-defined pseudocolour $(C_P)$, where a colour is defined as colour values for each of the red (R), green (G) and blue (B) channels.

9 Claims, 13 Drawing Sheets

METHODS FOR DETECTING IF AN OBJECT IS VISIBLE

RELATED APPLICATION DATA

This application claims the benefit of Swedish Patent Application No. 1851157-6, filed Sep. 27, 2018, the disclosure of which is incorporate herein by reference in its entirety.

FIELD OF THE INVENTION

This invention relates to methods and systems for determining if an object in computer-generated three-dimensional environment is visible to a user.

BACKGROUND

Colour graphics are often defined and displayed using the RGB system. In this system a colour is defined by indicating how much of red, green and blue is included. The value of each of the red, green and blue channels may for example by described with a value from 0 to 1, or from 0 to 255.

In addition, objects in a computer-generated three-dimensional environment may have opacity. For example, window panes and fogs are objects that are partially opaque. The opacity is typically defined by a so-called alpha value.

The colour rendered to the user may, however, be different from the pre-defined colour, because the three-dimensional environment takes into account specific conditions for each time point of rendering such as lightning, reflections, and atmosphere conditions. The rendered colour is obtained by taking the values of the defined colours and transforming them, during the rendering process, according to algorithms of the rendering software.

SUMMARY OF THE INVENTION

There is a need for being able to know if an object can be observed by a user in a three-dimensional environment, for example, if it is possible for a user to see an advertising banner provided in the three-dimensional environment.

In a first aspect of the invention there is provided a method for determining if an object in a three-dimensional environment rendered on a display by a computer is visible for user with a defined point of observation in the three-dimensional environment, where the three-dimensional environment is rendered in real time and in colour, and where the object is defined by at least one area with a predefined colour ($C_D$) where said area is rendered with a colour ($C_R$) that is different from the predefined colour due to the rendering conditions at a defined time point, and where there is a pre-defined pseudocolour ($C_P$), where a colour is defined as colour values for each of the red (R), green (G) and blue (B) channels, and where the following steps are carried out:
a) selecting a point on the object which point is a point in space in the three-dimensional environment,
b) using the rendering conditions for the selected point in space at the defined time point, determine processed pseudocolour values ($C_X$) based on the pseudocolour ($C_P$),
c) determining the difference ($D_R$, $D_G$ and $D_B$) between $C_P$ and $C_X$, for each of the R, G and B channels;
d) making a resultant vector of vectors for $D_R$, $D_G$ and $D_B$ where each of $D_R$, $D_G$ and $D_B$ is considered as a vector along a separate axis in a three-dimensional coordinate system,
e) using the resultant vector to determine if the object is visible.

Rendering may be carried out with a rendering frequency and steps a)-e) may then preferably be carried out repetitively and with a frequency that is lower than the rendering frequency.

The rendering software may determine the rendering conditions for the graphical environment each rendering cycle, and where the rendering conditions thus determined is used to both carry out step b) and to determine $C_R$.

The rendering conditions for the graphical environment may be used to first to carry out step b) and then to determine $C_R$.

Step e) may be carried out by determining that an object is visible if the resultant vector is no longer than a predetermined threshold T.

$D_R$, $D_G$ and $D_B$ may be determined as the absolute values of the difference between $C_P$ and $C_X$ for each of the colour channels.

The pseudocolour is preferably chosen so that that the R, G and B values of the pseudocolour has an intensity larger than the threshold, but smaller than the maximum value minus the threshold value.

An array of detection points in an predefined pattern may be superimposed on the object, and steps a) to e) may be carried out for each of the points on which the detection points are superimposed, and where the object is considered to be visible of a minimum number of points are visible.

In a second aspect of the invention there is provided a method for determining if an object in a three-dimensional environment rendered on a display by a computer is visible for a user with a defined point of observation in the three-dimensional environment, where the three-dimensional environment is rendered in real time and in colour, and where the object is defined by at least one area with a predefined colour ($C_D$) where said area is rendered with a colour ($C_R$) that is different from the predefined colour due to the rendering conditions at a defined time point, and where there is a pre-defined pseudocolour ($C_P$), where a colour is defined as colour values for each of the red (R), green (G) and blue (B) channels, and where the following steps are carried out:
a) selecting a point on the object which point is a point in space in the three-dimensional environment,
b) using the rendering conditions for the selected point in space at the defined time point, determine processed pseudocolour values ($C_X$) based on the pseudocolour ($C_P$),
c) using the processed pseudocolour values ($C_X$) to determine if the object is visible.

In one embodiment of the invention each area in the three-dimensional environment is assigned a value for opacity (alpha value), and the following steps are carried out for the selected point of the object:
a) identifying all points for rendered objects along a straight line between the point of observation and the selected point,
b) determining the opacity values (alpha value) for each of said points identified in step a),
c) adding the opacity values of said points, and
d) using the value of step c) to determine if the object is visible.

In a third aspect of the invention there is provided a computer system comprising a model of a three-dimensional environment, a display, rendering software and visibility detection software, where the rendering software is configured to render the three-dimensional environment in real time and in colour on the display, the visibility detection software being configured to determine if an object in the three-dimensional environment is visible for a user, where said user has a defined point of observation in the three-dimensional environment, where the object is defined in the model with at least one area with a predefined colour ($C_D$) where the area is rendered with a colour ($C_R$) that is different from the predefined colour due to the rendering conditions at a defined time point, and where there is a predefined pseudo colour, where a colour is defined as colour values for each of the red (R), green (G) and blue (B) channels, and where the software is configured to a) select a point on the object, which point is a point in space in the three-dimensional environment,
 b) using the rendering conditions for the point in space at the defined time point, calculate processed pseudocolour values ($C_X$) based on the pseudocolour ($C_P$),
 c) determine the difference between $C_P$ and $C_X$, for each of R, G and B;
 d) making a resultant vector of vectors for $D_R$, $D_G$ and $D_B$ where each of $D_R$, $D_G$ and $D_B$ is considered as a vector along a separate axis in a three-dimensional coordinate system,
 e) using the resultant vector to determine if the object is visible.

In a fourth aspect of the invention it is provided a method for determining if an object in a three-dimensional environment rendered on a display by a computer is visible for user with a defined point of view in the three-dimensional environment, where the three-dimensional environment is rendered in real time and in colour by rendering software, and where the object is defined with at least one dot with a predefined colour ($C_D$) where the at least one dot is selected for rendering by the rendering software and rendered with a colour ($C_R$) that is different from the predefined colour due to the rendering conditions at a defined time point, where a colour is defined as colour values for each of the red (R), green (G) and blue (B) channels, and where the following steps are carried out: a) receiving from rendering software the defined colour values ($C_D$) for at least one dot, or using the defined colour values of a pseudocolour ($C_P$), and 1) receiving from rendering software the colour values for the rendered colour ($C_R$) for the dot, or, 2) allowing rendering software to, using the rendering conditions for the dot at the defined time point, calculate colour values $C_X$ based on $C_P$, then b) determining the difference ($D_R$, $D_G$ and $D_B$) which is between $C_D$ and $C_R$, or the difference ($D_R$, $D_G$ and $D_B$) between $C_P$ and $C_X$, for each of R, G and B; then c) making a resultant vector of vectors for $D_R$, $D_G$ and $D_B$ where each of $D_R$, $D_G$ and $D_B$ is considered as a vector along a separate axis in a three-dimensional coordinate system, then d) using the resultant vector to determine if the object is visible.

The method provides an efficient and low-cost (from processing point of view) of determining if an object is visible for a user.

In a preferred embodiment step d) is carried out by determining that an object is visible if the resultant vector is no longer than a predetermined threshold T. $D_R$, $D_G$ and $D_B$ may be determined as the absolute value of the difference between $C_D$ and $C_R$, or as the difference between $C_P$ and $C_X$.

In a preferred embodiment, a pseudocolour is used. Accordingly, step a) is carried out by allowing rendering software to, using the rendering conditions for the dot at the defined time point, calculate colour values $C_X$ based on $C_P$ and where step b) is carried out using the colour values for $C_P$ and $C_X$. This has the advantage of providing a more sensitive determination of sensitivity, in particular when CD is close to the its limit values (for example when CD is black or close to black). In an even more preferred embodiment the pseudocolour is chosen so that that the R, G and B values of the pseudocolour has an intensity larger than the threshold, but smaller than the maximum value minus the threshold value.

When the object is rendered with a plurality of dots (this is typically the case) steps a)-d) is, in a preferred embodiment, carried out for a predetermined number of a plurality of dots and the object is considered to be visible if a minimum number of dots are visible. The dots may be dots arranged in in a predefined pattern.

In one embodiment, the opacity values of objects between the point of observation and the object are taken into account, and accordingly the following steps are carried out, where each dot in the three-dimensional environment is assigned a value for opacity (alpha value), and the additional steps are carried out: a) selecting at least one dot of the object, b) identifying all dots for rendered objects along a straight line the point of observation and the selected dot, c) receiving from rendering software, the opacity values (alpha value) for each of said identified dots, d) adding the opacity values of said dots, and e) determining that the object cannot be seen if the sum of opacity values is higher than a predetermined threshold. This method may also be used by itself without $C_D$ or $C_P$. The system may also be arranged to carry out this invention.

In a fourth aspect of the invention, there is provided a computer system comprising a model of three-dimensional environment, rendering software and visibility detection software, where the rendering software is configured to render the three-dimensional environment in real time and in colour on the display, the rendering software being configured to determine if an object in the three-dimensional environment can be seen by a user with a defined point of view in the three-dimensional environment, where the object is defined in the model with at least one dot with a predefined colour ($C_D$) where the at least one dot can be selected by rendering software for rendering by the rendering software and can be rendered with a colour ($C_R$) that is different from the predefined colour due to the rendering conditions at a defined time point, where a colour is defined as colour values for each of the red (R), green (G) and blue (B) channels, and where the where the visibility detection software is configured to a) receive from rendering software the defined colour values ($C_D$) for at least one dot, or using the defined colour values of a pseudocolour ($C_P$), and 1) receiving from the rendering software the colour values for the rendered colour ($C_R$) for the dot, or, 2) allowing rendering software to, using the rendering conditions for the dot at the defined time point, calculate colour values $C_X$ based on $C_P$, and b) determine the values $D_R$, $D_G$ and $D_B$ for the difference between $C_D$ and $C_R$, or for the difference between $C_P$ and $C_X$, for each of R, G and B; c) making a resultant vector of vectors for $D_R$, $D_G$ and $D_B$ where each of $D_R$, $D_G$ and $D_B$ is considered as a vector along a separate axis in a three-dimensional coordinate system, d) using the resultant vector to determine if the object is visible.

DRAWINGS

The accompanying drawings form a part of the specification and schematically illustrate preferred embodiments of the invention and serve to illustrate the principles of the invention.

FIG. 1A schematically show a computer-generated three-dimensional environment.

FIG. 1B shows an object is composed of a plurality of areas.

FIG. 2 schematically show a computer system.

FIG. 3 schematically show the software of a computer system.

Figure 9:
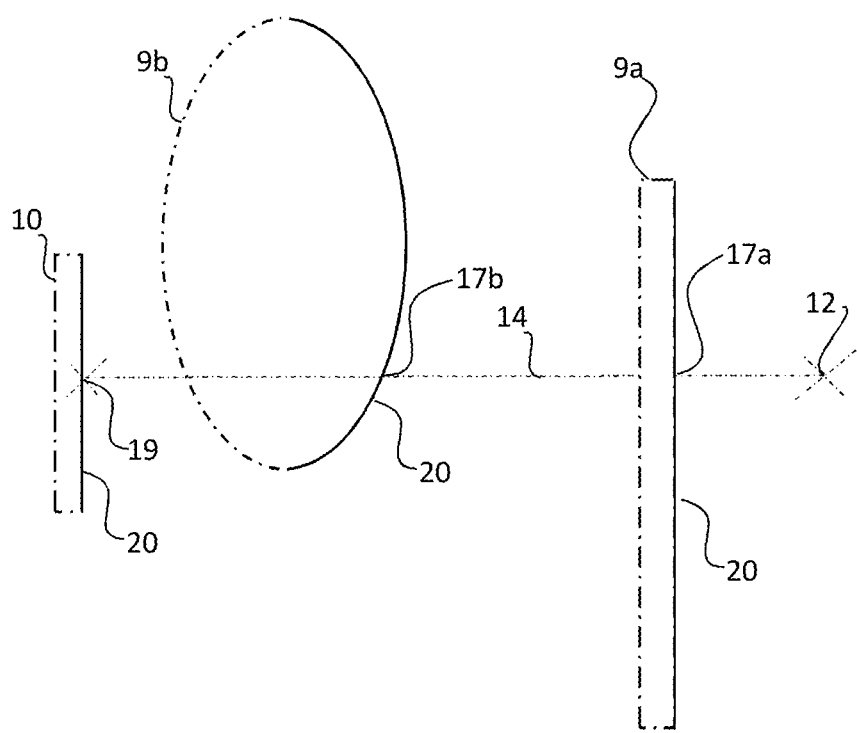

FIG. 9 schematically show a scene in a computer-generated three-dimensional environment seen from above.

Figure 10:
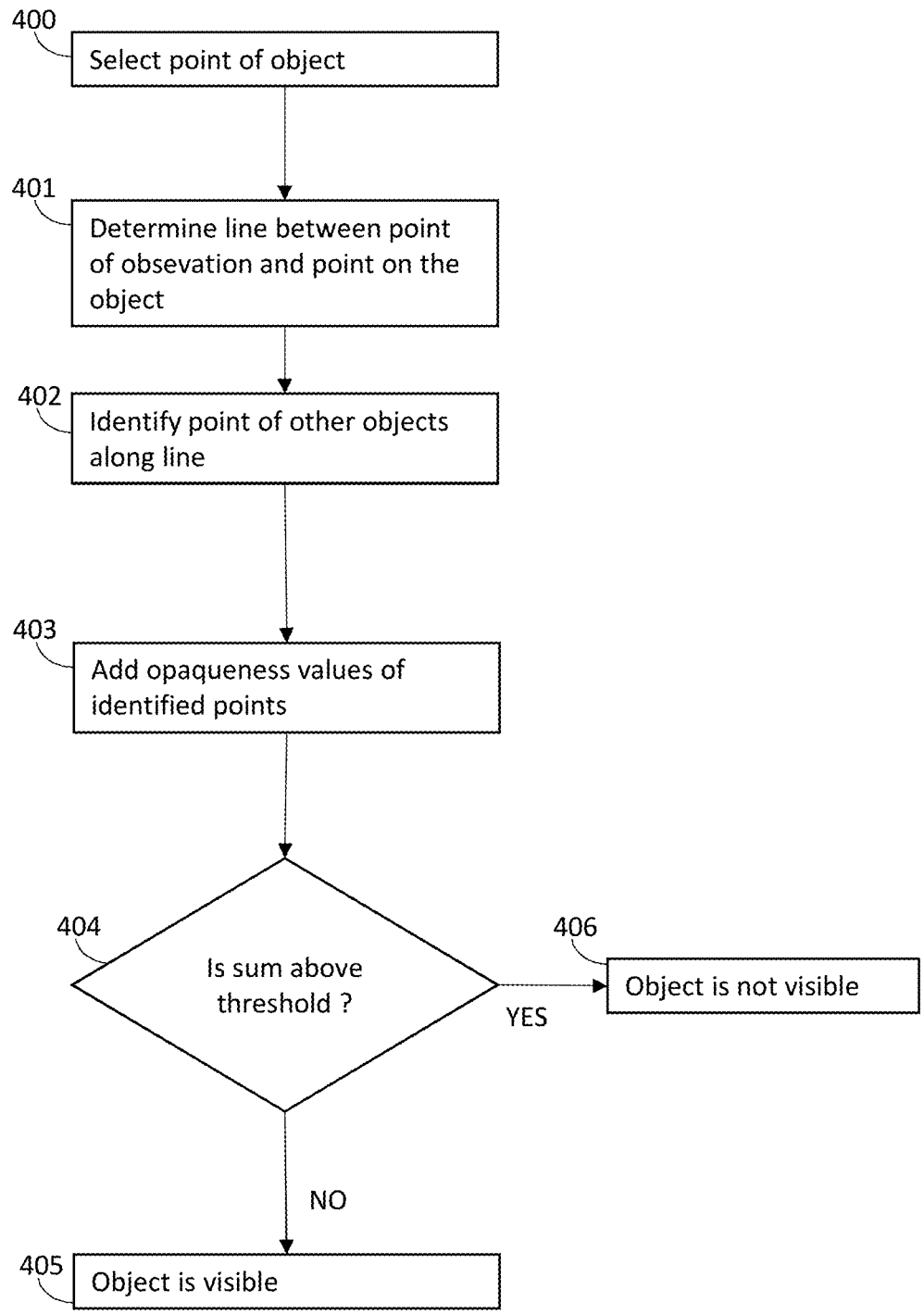

FIG. 10 is flowchart showing a method.

Figure 11:
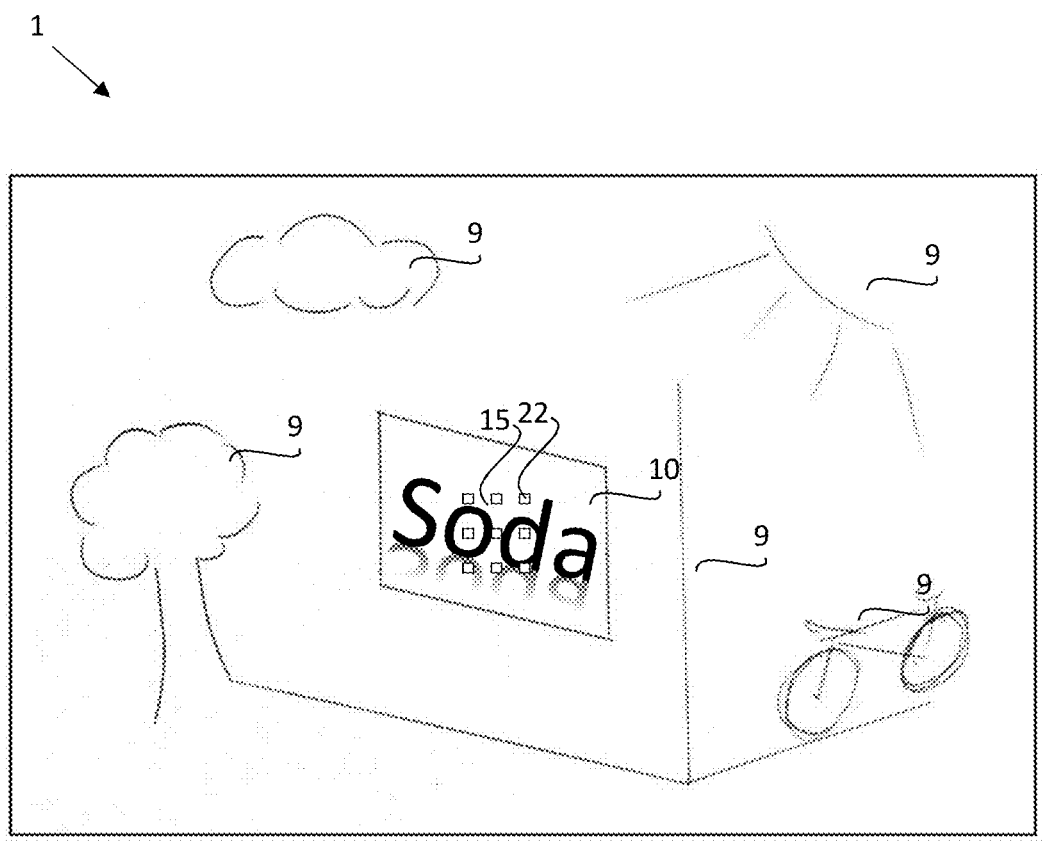

FIG. 11 schematically show the use of detection points.

Figure 12:
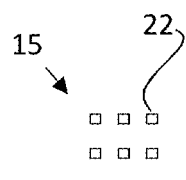
Figure 13:
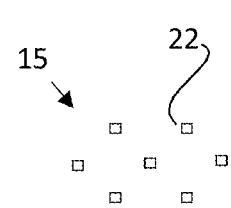
Figure 14:
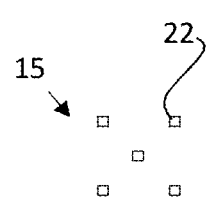

FIGS. 12-14 show arrays of detection points.

Figure 15:
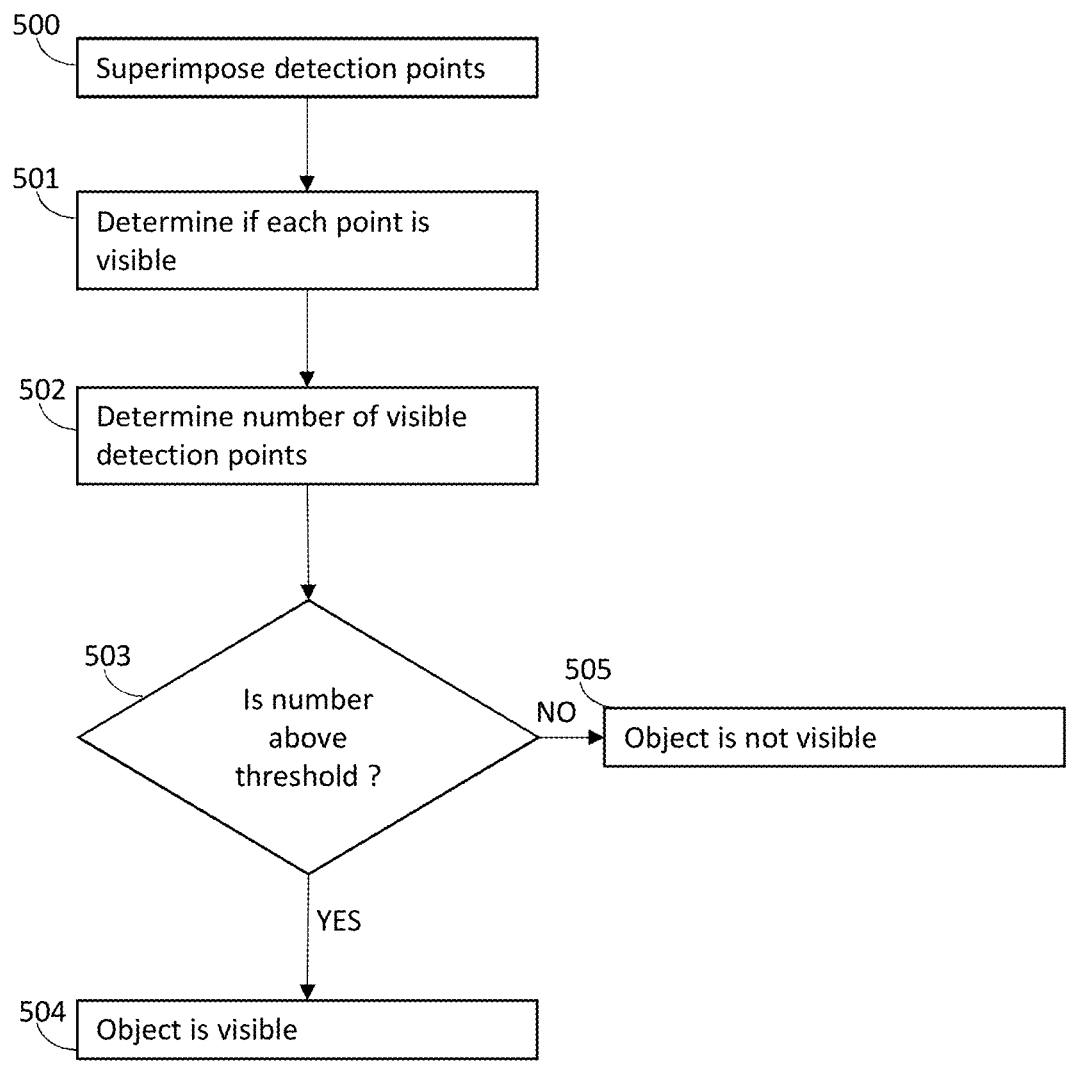

FIG. 15 is a flowchart showing a method.

Figure 16:
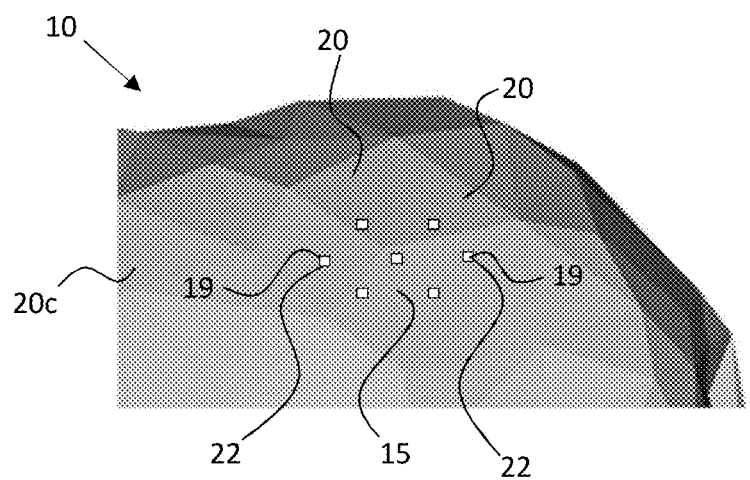

FIG. 16 shows the use of detection points.

Figure 17:
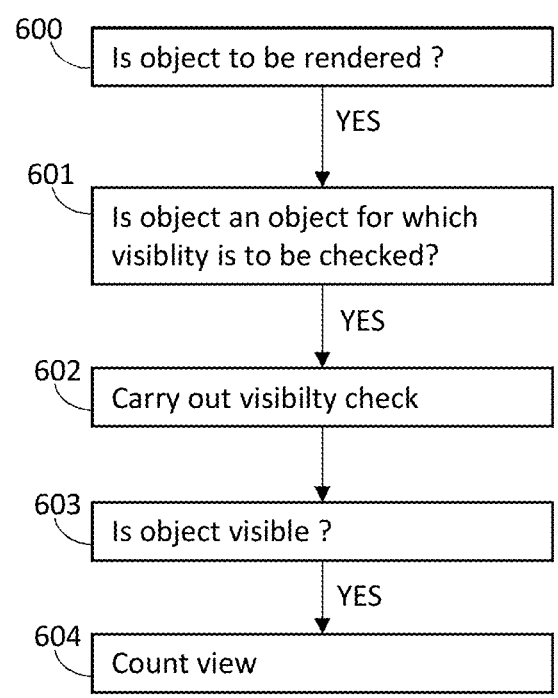

FIG. 17 shows a method.

DETAILED DESCRIPTION

Figure 1A:
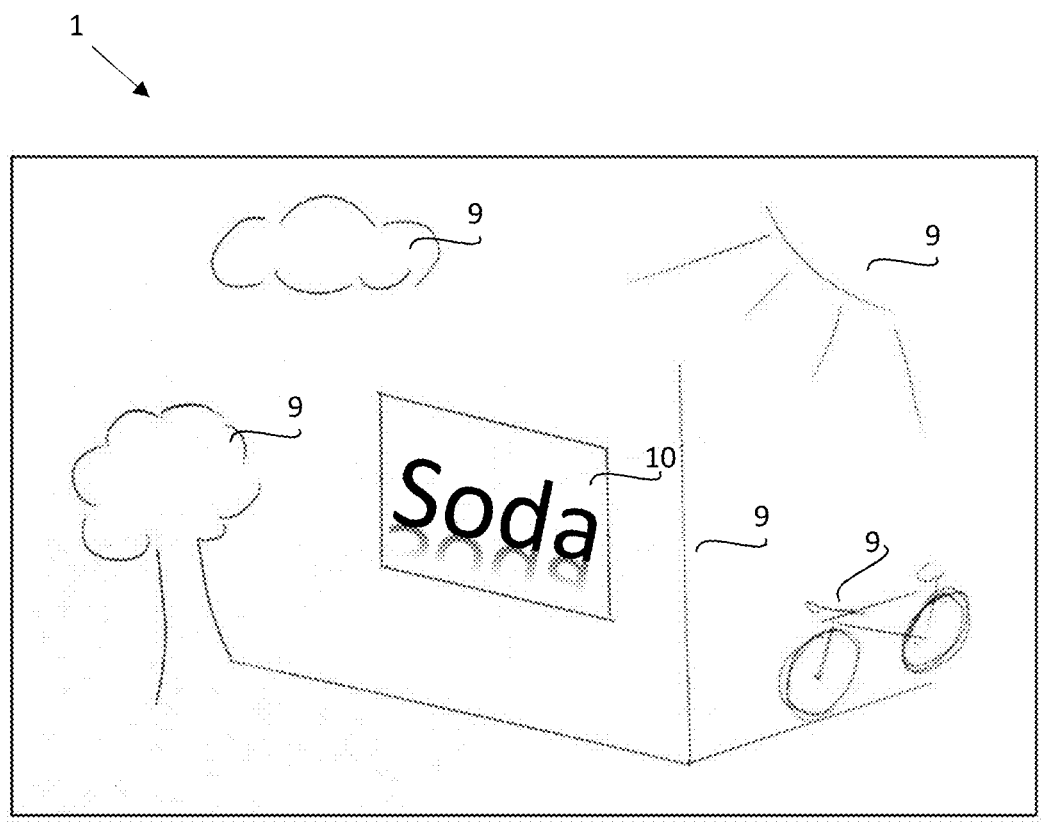

The invention relates to a computer-generated three-dimensional environment 1 (FIG. 1A) rendered to a user and experienced by the user as a three-dimensional environment. The user experiences looking at objects 9, 10 in this case a building, a tree, a bicycle, etc. rendered on a display 5. Object 10 is an advertisement.

Figure 2:
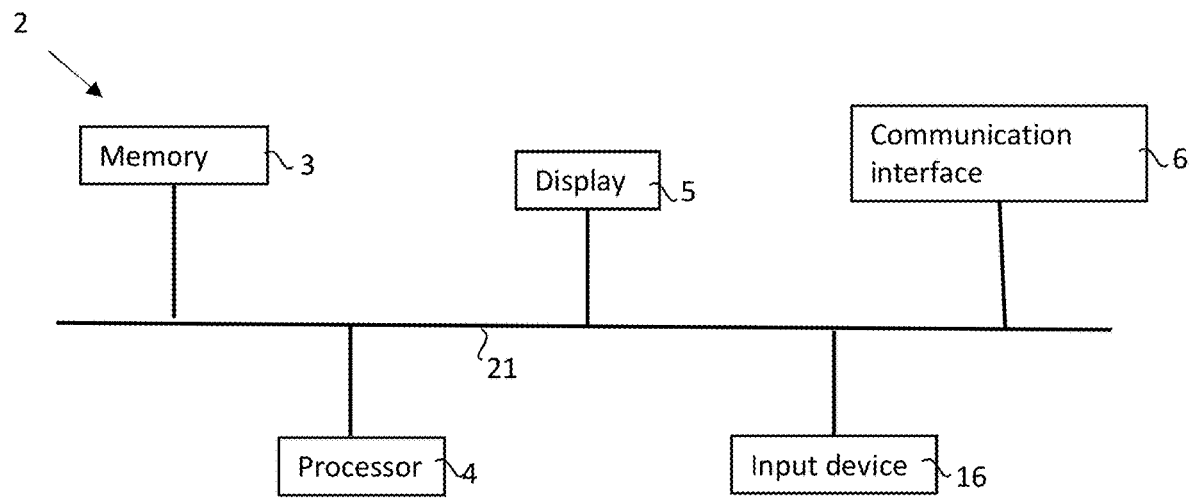

With reference to FIG. 2, computer system 2 has memory 3, processor (CPU) 4, display 5 and may have communication interface 6. The memory 3 may comprise a solid-state memory and a RAM memory. The components of the system 2 may be in electrical communication with each other using a bus 21. The computer 2 may be for example a PC, a smartphone, a tablet computer or game console such as PlayStation.

Computer system 2 may be a distributed computing system such that parts of memory 3 and/or processor 4 may be located at a different physical location, for example at a server.

The various components of a distributed computing system may communicate through a computer network, for example a wide area network (WAN) such as the internet, with the aid of communication interface 6.

Figure 3:
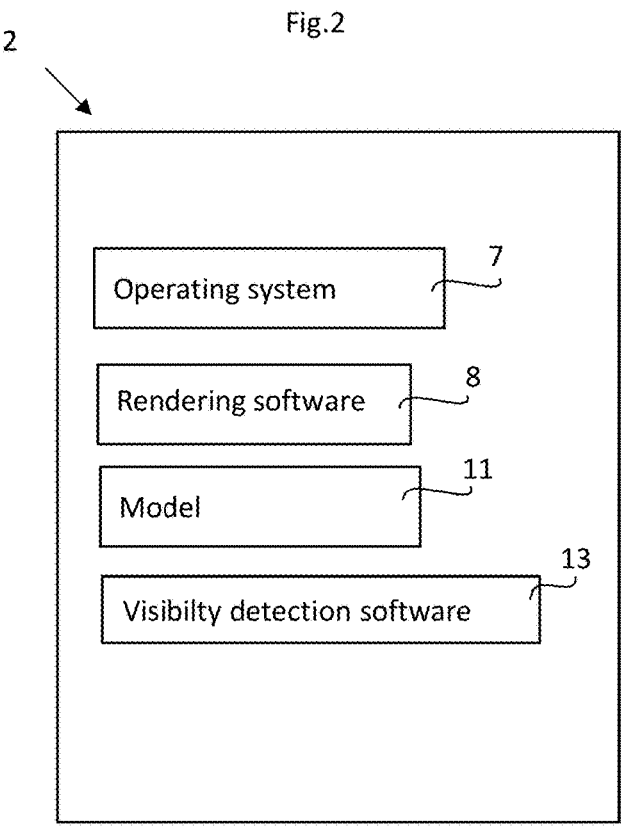

The display 5 is typically a LCD or a LED display but other types of display technologies can be used. The display 5 is preferably a pixel array based on a dot matrix such as a bitmap. The dot matrix is preferably a 2-dimensional dot matrix or a bitmap. The display may be a flat 2-dimensional display. When the computer-generated three-dimensional environment 1 is a virtual reality environment, the display 5 is typically provided in a device worn on the head of the user. Examples of head-worn devices include Oculus Rift, HTC, Vive and PlayStation VR. Computer system 2 may also comprise one or more input devices 16 with which a user can provide input to the computer system 2, such as a keyboard, joystick, touchscreen or similar. Various software components of the computer system 2 is shown in FIG. 3. Computer system may, for example, comprise operating system 7. Any suitable programming language may be used for the software of the systems. Suitable programming languages may include C++, C# and Java and shader languages HLSL, GLSL and cg.

The three-dimensional environment 1 may be for example a part of a game, or other computer simulation of an environment. The computer-generated three-dimensional environment 1 may in particular be comprised in a computer game, such as for example a first-person shooter game, a strategy game, and adventure game or a sandbox game. The three-dimensional environment 1 is preferably based on model 11 in which at least some objects 9,10, and typically most or all objects 9,10 (such as for example buildings, trees, furniture, cars) are predefined. The model 11 may comprise a three-dimensional map in which objects 9,10 are placed. The three-dimensional environment 1 is preferably a completely pre-designed as in the case of most video games or virtual reality applications. The model 11 comprises instructions for rendering the objects 9, 10 comprising information about shape, size and colour and location for each of the objects 9, 10. Advertising objects 10 may are typically provided from an advertising server and inserted to the model 11 at some time point before rendering, such as for example at start-up of the rendering software 8. For example, the system 2 may provide a query to advertising server for data comprising instructions for rendering objects 10 which are then used to populate a placeholder. A placeholder typically defines at least a position in the model 11 of the three-dimensional environment 1 but may also preferably define an orientation. The placeholder may also specify what type of advertisement that should be inserted into a placeholder, such as if the advertisement is directed to a certain age group, or if the object 10 should have certain graphical properties such as size, shape, resolution or proportions. Such data may be used by server to select an advertisement 10 from a plurality of advertisements and provide instructions for rendering the selected advertisement 10 to the system 2. It should be noted that object 9 and object 10 are basically treated in the same fashion by rendering software 8 during rendering. Placeholders are typically designed into the model 11 when the model 11 is built, for example by a game designer.

System 2 may send information about how many times an object 10 has been visible to the advertising server. Information may be provided in real time or in batches. The advertising server may maintain a database of the number of times of objects 10 has been visible.

The system 2 comprise rendering software 8 for generating a three-dimensional environment 1 on the display 5. Rendering software 8 causes pixels of display 5 to assume colours as defined by model 11, possibly modified due to specific rendering conditions at the time of rendering, as described below, as is known in the art. The conditions may of course change over time during rendering, for example as the point of observation 12 (FIG. 12) changes or the position of object 9,10 changes, or for other reasons. For example, if a cloud passes over the sun in the three-dimensional environment 1, the lighting conditions of the scene changes. Examples of suitable rendering software 8 includes the Unity and Unreal game engines.

The three-dimensional environment 1 has a defined point of observation 12 (FIG. 9), which is the position in the three-dimensional environment 1 from which observation appears to take place. This position may also be referred to as the "position of camera" or "position of the eye". The point of observation 12 may be defined by three coordinates in the three-dimensional environment. The point of observation 12 is typically associated with a direction of observation.

Preferably the three-dimensional environment 1 is able to change in real time. Thus, it may be updated in real time. Each time the three-dimensional environment 1 is updated is a rendering cycle. Rendering of three-dimensional environment 1 takes place with a rendering frequency with may be 20 Hz-150 Hz, more preferably 30 Hz-90 Hz. For each rendering cycle, the rendering software determines which objects 9,10 (or parts of objects 9,10) that are visible from the point of observation 12 and which colours they have. Typically, the user is able to virtually move around (translate and/or rotate) in the three-dimensional environment 1 thereby changing his/her point of observation 12 in the three-dimensional environment 1, for example by using input device 16, for example a hand-held control or defined keys of a keyboard, or by touching a touch display. The three-dimensional environment 1 may be a virtual reality three-dimensional environment which changes according to the movements of the user as detected with sensors that detects the movements of the user.

Returning to FIGS. 2 and 3, The system 2 comprises visibility detection software 13. The purpose of visibility detection software 13 is to determine if an object 10 in the three-dimensional environment 1 can be seen (is visible) by a user from the point of observation 12. The object 9 may be an object that provides advertising, for example a virtual billboard 10.

Figure 1B:
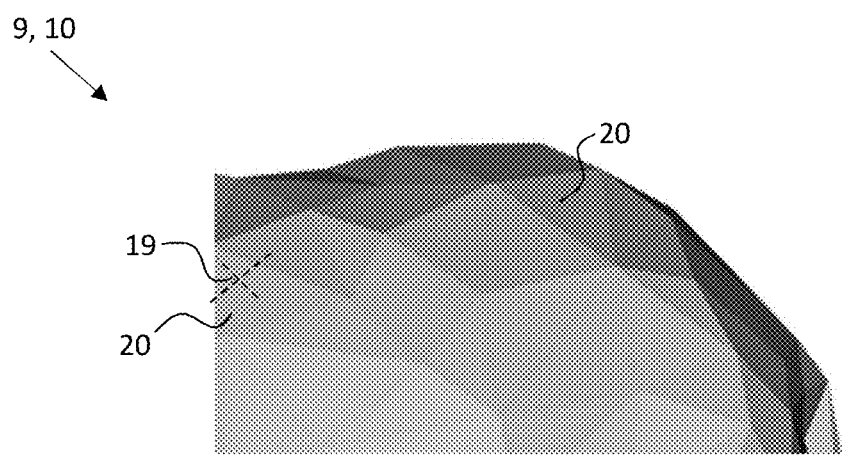

An object 9,10 in the model 11 can be defined in various ways. Object 9,10 is a 3-dimensional or a 2-dimensional object in the three-dimensional environment. The object 9,10 may for example be defined as a surface or a volume. With reference to FIG. 1B, the object 9,10 is defined by at least one area 20 representing the surface of the object 9,10. In computer graphics the area 20 is typically a polygon, often a triangle. Objects 9,10 are typically made up of several areas 20. Each point 19 of area 20 will have a defined colour $C_D$. For example, $C_D$ may for a point 19 be defined as a colour in a texture map comprised in model 11. UV texture mapping may be used to identify the correct colour to be used for rendering an area or a part of an area 20 of an object 9,10, as is known in the art. Hence, a the texture map can be used to find colour values for each point 19 of the area 20. A point 19 lacks area and cannot be seen as such, however at least a part of area 20 to which point 19 can be considered as visible or not visible. The area 20 may for example be a dot with a small area.

$C_D$ may be defined in any suitable way. In a preferred embodiment, $C_D$ is defined using the RGB scale, where each of the red (R), green (G) and blue (B) values are assigned a value, typically a value from 0-255 where 0 is no colour and 255 is maximum colour. Thus, the colour is defined with three values such as "255, 19, 2" which defines an orange colour. In addition, a point may have a so-called alpha value which defines the opacity of an area or a part of area 20.

All or a part of the area 20 of the object 9,10 is selected by rendering software 8 for rendering by rendering software 8 at each rendering cycle. The selection depends on several factors comprised in the algorithms of the rendering software 8 such as orientation of the object 9,10 in relation to the point of observation 12, the distance between the object 9, 10 and the point of observation 12 (where fewer areas 20 of object 9,10 are rendered for an object 9,10 that is far away), and also clipping algorithms, etc. Moreover, backside of objects 9,10 are not rendered and parts of objects 9,10 that are obscured by other objects 9,10 are also not rendered. This selection is hence done by rendering software 8 as is known in the art.

Rendering software 8 causes pixels of display 5 to display a certain colour. During rendering, the rendering software 8 takes into account various rendering conditions at a defined time point (rendering cycle), such as reflections, shading and lighting conditions. Rendering software 8 modifies the pre-defined colour $C_D$ and may therefore render on the display 5 a colour, $C_R$, which is different from $C_D$. For example, the colour of a car should be displayed differently if it placed in shade or in direct sunlight. The colour may also be displayed different in a foggy morning than in a sunny sunset. In addition, glossy surfaces may reflect the colour of other objects, etc. This is achieved with methods known in the art and is carried out by rendering software 8.

Figure 4:
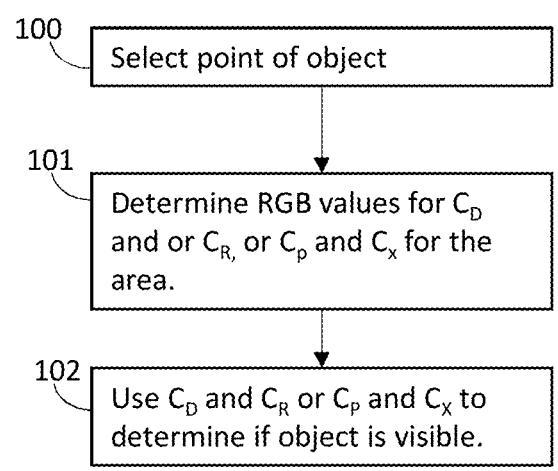
FIGS. 4-5 are flowcharts showing methods.

With reference to FIG. 4, a method for determining if an object 10 is visible comprises the steps of 100 of selecting at least one point 19 on of object 10 to be analysed. Rendering software 8 keeps track of which parts of object 9, 10, in particular an ad object 10, from the model 11 are being rendered at a certain time point. For example, if the object 10 is far away, the object 10 is rendered relatively small and not all areas 20 that define the object 10 in model 11 are rendered. As a further example, the "backside" of non-opaque objects 10 are not rendered (an example is shown in FIG. 12). Furthermore, objects 10 outside the field of view, for example "behind" the point of observation 12 of the user, are not rendered. Accordingly, preferably, a point 19 on area 20 that is rendered by rendering software 8 is selected. The point 19 is a point on the surface of object 9,10 and has a defined position in the model 11 of the three-dimensional environment 1. Hence the location of the point 19 may be defined by X, Y and Z coordinates in the model 11.

In step 101 the defined colour value $C_D$ of the selected area 20 is obtained from rendering software 8. The defined colour value may be provided from the model 11, for example from a texture map for the object 10.

In certain preferred embodiments, described in more detail below, the defined colour of the area 20 of the object 10 (which is used for rendering) is not used, and instead a pseudocolour $(C_P)$ is used. The pseudocolour is treated in the same way as $C_D$ by visibility detection software 13 but is not used for rendering on display 5.

$C_D$ is used by rendering software 8 to obtain $C_R$ using rendering conditions at a defined time point and during rendering. The rendering conditions at a defined time point may include, for example, the lighting and shadow conditions for a particular scene at a certain time point during rendering. The rendering conditions may be specific for each point in space of the three-dimensional environment 1. The colour value $C_R$ is subsequently used to render the colour of the area 20 of the object 10 on the display 5, and actual rendering on display 5 may be done in parallel, or before or after steps 100-102 are carried out. However, determination of visibility is preferably done in real time during rendering. Determination of visibility is preferably done in parallel as the rendering software 8 renders the three-dimensional environment. Thereby, the conditions during rendering can be "re-used" by the processor as described below.

Preferably the selected point 19 belongs to an area 20 is an area 20 that is known to be rendered (will be or has been rendered) on the display 5, taking into account, for example, the position and pose of point of observation, clipping algorithms etc.

In step 102 $C_R$ and $C_D$ (or $C_P$ and $C_X$ described below) is used to determine if the object 10 is visible. This is done by visibility detection software 13. The values for $C_R$ and $C_P$ are provided by rendering software 8 to visibility detection software 13.

In one embodiment rendering on the display 5 takes place after step 101 but before step 102.

Optionally, in step 102, the values for $C_R$ (or $C_X$) is modified by rendering software 13 by multiplying with a colour factor Fc, which is preferably is different for each of the R, G and B channels. The colour factor is selected dependant on how sensitive the human eye is for each of red, green and blue.

Step 102 can be carried out in different ways as described below and with reference to FIGS. 5-8. Step 102 may, for example, be carried out by determining if $C_R$ (or $C_X$) or each of the channels R, G and B are within allowed limits. In one embodiment there are threshold values $T_{MAX}$ and $T_{MIN}$ min for each of the RGB channels and the area is considered visible only if the $C_R$ values are below $T_{MAX}$ and above $T_{MIN}$ for each of the channels:

$$T_{RMIN} < C_{RR} < T_{RMAX}$$

and $$T_{GMIN} < C_{RG} < T_{GMAX}$$

and $$T_{BMIN} < C_{RB} < T_{BMAX}$$

In one embodiment the difference between $C_R$ and $C_D$ is calculated by visibility detection software. The difference is determined for each of R, G and B, so that values $D_R$, $D_G$ and $D_B$ are obtained.

Figure 5:
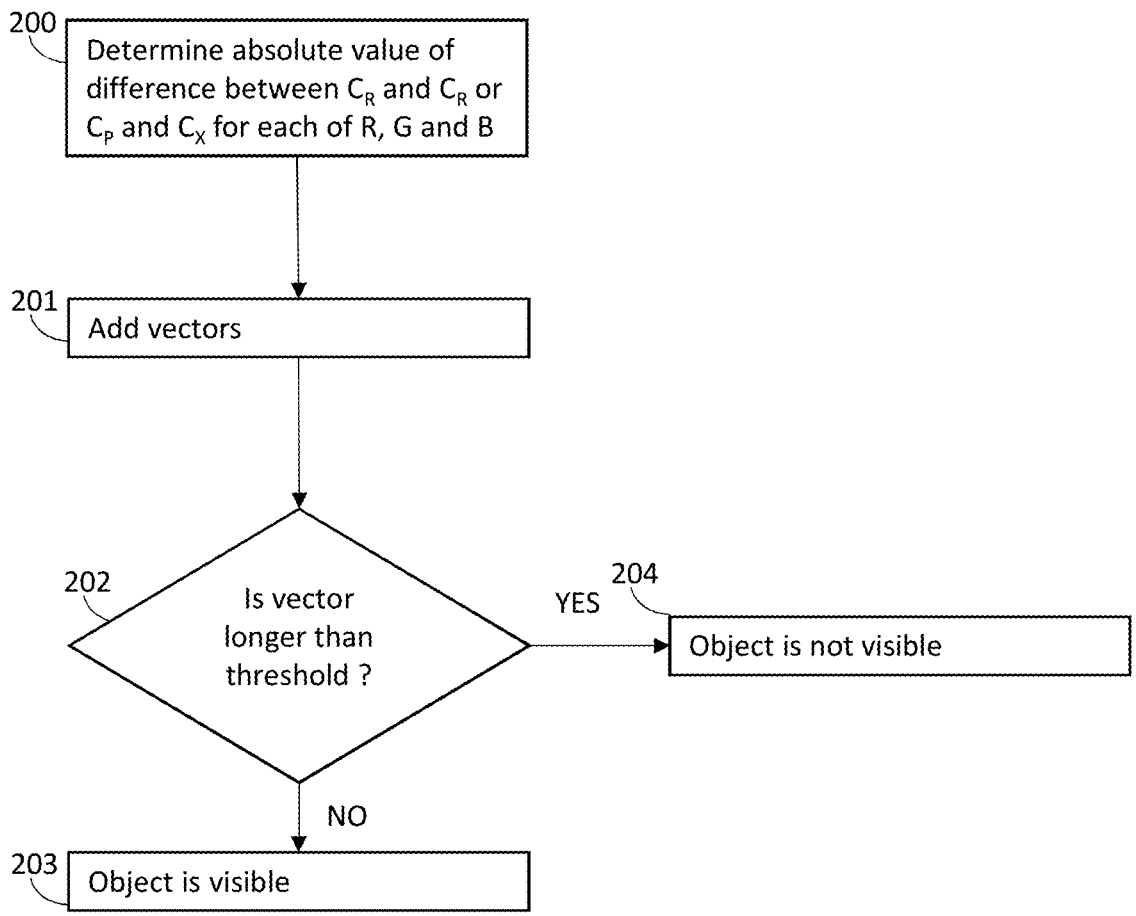

With reference to FIG. 5, in one embodiment the absolute value of the difference between $C_R$ and $C_D$ is calculated by visibility detection software 13 to obtain D:

$$|C_R - C_D| = D$$

D is determined for each of R, G and B, so that values $D_R$, $D_G$ and $D_B$ are obtained. $D_R$, $D_G$ and $D_B$ is used for determining if the area 20 to which point 19 belongs is visible to a user. This can be done in different ways. For example, the area 20 is visible if each of $D_R$, $D_G$ and $D_B$ is lower than a predefined threshold T, which may be different for each of the R, G and B channels so that the area 20 is visible if $$D_R < T_{RMAX}$$

and $$D_G < T_{GMAX}$$

and $$D_B < T_{BMAX}$$

Here it is required that the values for each of $D_R$, $D_G$ and $D_B$ are lower than the thresholds $T_{RMAX}$, $T_{GMAX}$ and $T_{BMAX}$ for the area 20 to which point 19 belongs to be classified as visible. $T_{RMAX}$, $T_{GMAX}$ and $T_{BMAX}$ may have different values.

Figure 6:
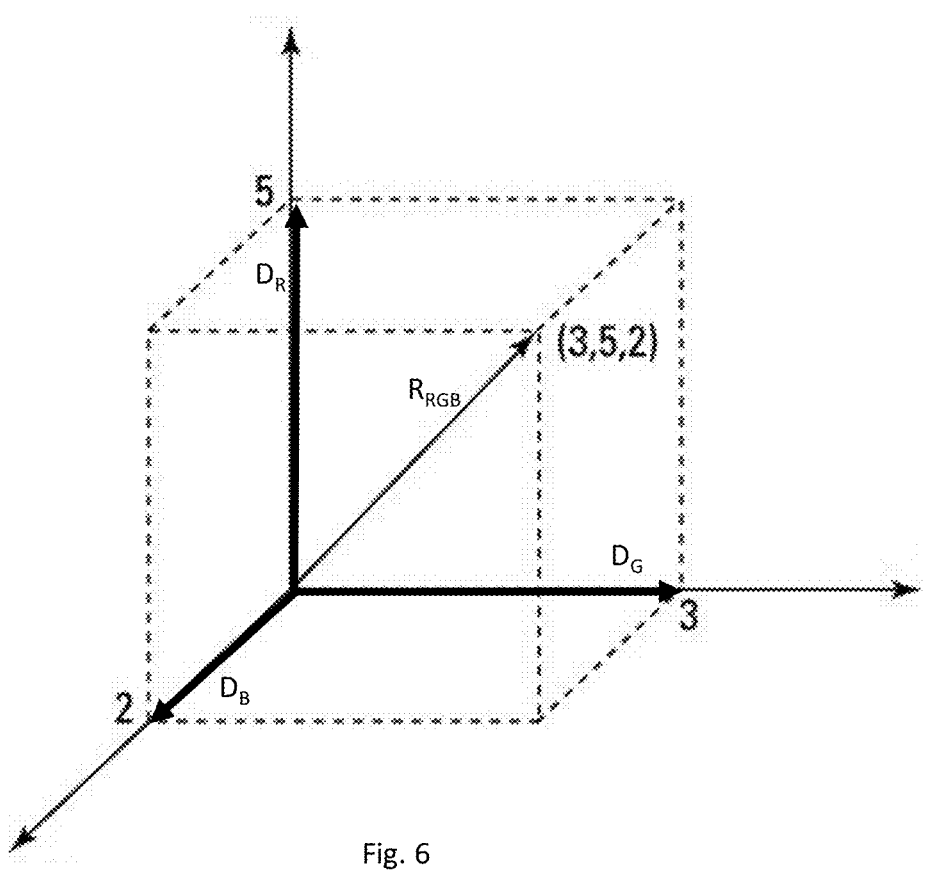
FIG. 6 is a graph schematically shows vectors in a 3-dimensional coordinate system.

In one embodiment, shown in FIG. 5, step 102 from FIG. 4 is carried out using vectors for D. In step 200 the absolute values $D_R$, $D_G$ and $D_B$ are determined as described above. In step 201 a resultant vector of $D_R$, $D_G$ and $D_B$ is created. This is done by calculating the vector sum of $D_R$, $D_G$ and $D_B$ in a three-dimensional coordinate system, where each of the X, Y and Z axis represents one of $D_R$, $D_G$ and $D_B$ to obtain the resultant vector $R_{RGB}$. An example (schematic and not to scale) is shown in FIG. 6. If $R_{RGB}$ has no length it means that the rendered colour $C_R$ is the same as the pre-defied colour $C_D$.

In step 202 the resulting vector $R_{RGB}$ is compared to a predetermined threshold T. If the length of the resulting vector $R_{RGB}$ is not longer than a predefined threshold T, the object is visible in step 203. If $R_{RGB}$ is longer than T, the object is not visible in step 204. This provides a simple and efficient way of processing the data.

In a preferred embodiment, a pseudocolour $C_P$ is used instead $C_D$ for determining visibility of object 10. $C_D/C_R$ is still used by rendering software 8 for rendering on display 5. In a preferred embodiment, the vector method described above is used. $C_P$ is processed by rendering software 8 using the rendering conditions at the defined time point for the selected point 19, i.e. the conditions used by rendering software 8 to process $C_D$ to obtain $C_R$. In general, $C_P$ and $C_X$ (described below) are used by visibility determination software 13 in the same way as $C_D$ and $C_R$.

Figure 7:
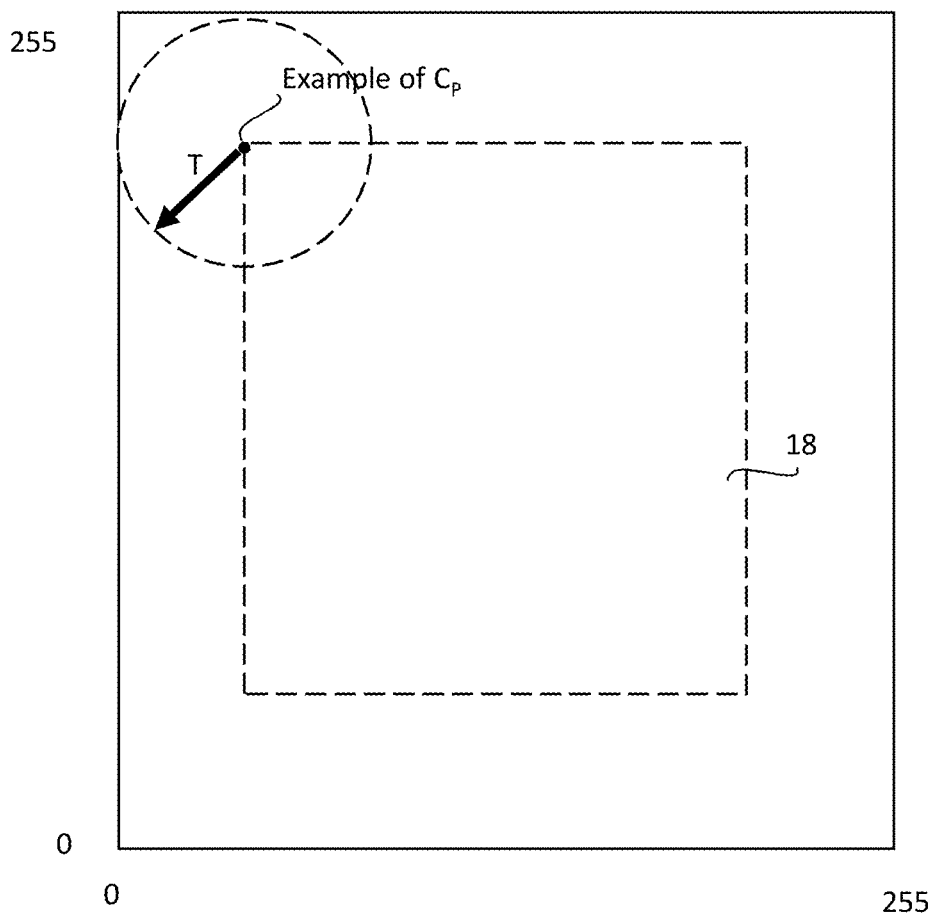
FIG. 7 is graph showing the selection of pseudocolour.

The pseudocolour is preferably pre-defined. Preferably the same pseudocolour is always used for all objects 10 for which visibility should be determined. The pseudocolour is preferably chosen so that its R, G and B values are not extreme. For example, a grey colour or a colour close to grey may be used. In the 0-255 RGB system, the values for each of R, G and B may for example be from 80 to 180. In general, the R, G B values of the pseudocolour $C_P$ should be chosen so that each of the R, G and B values are larger than T and smaller than the maximum value for each of R, and B, minus T. This has the advantage of catching poor visibility conditions even if $C_R$ (for the actual defined $C_D$ of the area 20 of the object 10) has extreme values, for example if $C_R$ is close to white or black. FIG. 7 shows the allowed values 18 of the pseudocolour $C_P$ for a threshold T, simplified to a 2-dimensional system with two colours R and G that each can have a value of from 0 to 255. With three channels (R, G and B) the allowed colour values of $C_P$ will be represented as a cuboid in a three-dimensional coordinate system and a sphere defined by the origin of the vector V may define the colours $C_X$ of visible objects.

It should be noted that $C_D$ of object 10 is still used by rendering software 8 to render object 10 on display 8. $C_R$ is obtained for $C_D$. Hence $C_P$ or $C_X$ is not displayed to the user. Rendering software 8 thus processes the area 20 twice using the same rendering conditions, once starting from $C_D$ and once starting from $C_P$.

Figure 8:
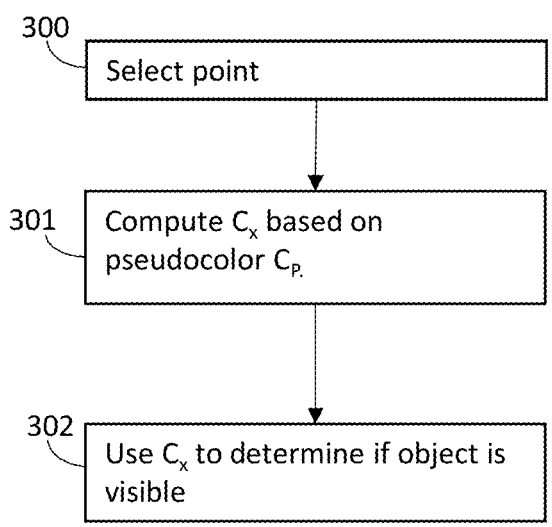
FIG. 8 is a flowchart showing a method.

In step 300 of FIG. 8, at least one point 19 of area 20 of object 10 is selected, as described herein. In step 301 the rendering software 8 computes a processed pseudocolour value ($C_X$) for the area based on the pseudocolour $C_P$ and the various specific rendering conditions of the situation (reflections, shades, etc.) at a time point. Conditions specific (such as reflection etc.) specific for point 19 as a point in the model 11 of the three-dimensional environment 1 may preferably be used. Visibility determination software 13 may provide $C_P$ to rendering software 8 which uses $C_P$ to calculate $C_X$. Rendering software 8 may then provide the obtained value of $C_X$ back to visibility determination software 13.

In step 302 the obtained $C_X$ values are used as described herein by visibility determination software 13, where the values for $C_P$ are used instead of $C_D$ and $C_X$ is used instead of $C_R$. For example, the absolute values of $C_P - C_X$ is calculated, to obtain D for each of the colour channels, vectors are added as in FIGS. 5-7, etc.

Preferably, the same pseudocolour $C_P$ is used for all analysed points 19 of object 10. Thus, steps 200-204 and 300-302 are carried out for all analysed points 19 of object 10, preferably all points 19 selected as described below, for example with reference to FIGS. 12-16. Hence, preferably the same pseudocolour $C_P$ is used every time visibly for an object 10 is determined. Accordingly, the same pseudocolour is preferably always used by system 2.

Opaqueness of Objects in the Line of Sight.

With reference to FIGS. 9-10, in a separate embodiment, the opacity values of all objects 9a, 9b between the point observation 12 and the object 10 are used to determine if the object 10 is visible. For example, an object 10 observed through fog or through a darkened windowpane is less visible than without the fog or the windowpane. FIG. 9 is a schematic overview of a scene of a three-dimensional environment 1 as seen from an imagined point of view above objects 9a 9b 10 and the point of observation 12. All objects 9a, 9b along a straight line 14 from the point of observation 12 a point 19 on and the object 10 at a certain time point are identified and their opacity values are collected. The opacity values are provided (preferably after addition, see below) by rendering software 8 to visibility determination software 13. As is known in the art, the opacity is often described by a so-called alpha value of a point 19 on object 9,10. The alpha values for objects 9, 10 are typically provided in a texture map, such as an UV texture map, comprised in model 11. Note that only areas 20 of object 9b facing the point of observation 12 is rendered, this is indicated by the dashed outline on the "backside" of object 9a, 9b, 10.

In FIG. 9 line 14 goes from point of observation 12 to a selected point 19 on area 20 of object 10. Line 14 crosses windowpane 9a and fog cloud 9b. The alpha value for the fog 9b cloud is $\alpha_F$ and the alpha value for the windowpane 9a is $\alpha_w$. The total alpha value is $\alpha_F+\alpha_w$. The sum is used for determining if the object 10 is visible. For example, If the sum of the alpha values is above a predetermined threshold T$\alpha$, area 20 of object 10 to which point 19 belongs is not visible to the user.

FIG. 10 shows a method. In step 400 at least one point 19 on an area 20 of object 10 is selected for analysis. In step 401, a straight line between the point of observation 12 and the point 19. In step 402 all points of other objects 9a, 9b along the line 14 are identified. Preferably, one point per intermediate object 9a, 9b is identified for one point 19 on object 10. Thus, in FIG. 9 one point 17a of object 9a and one point 17b of object 9b is identified. In step 403 the alpha values of the points 17a, 17b belongs are added. The sum can for example be calculated by the rendering software 8. The sum is then used to determine if the object 10 is visible. This may be done as in steps 404-406. A threshold may be used, for example as follows. In step 404 it is determined if the sum from step 403 is above a predetermined threshold. If the sum is above the threshold, it is determined in step 406 that the object 10 is not visible. If the sum is not above the threshold it is determined in step 405 that the object 10 is visible.

Steps 401-403 are preferably carried out by rendering software 8 before rendering on display. In one embodiment, rendering on the display 5 takes place after step 403 but before step 404.

The method shown for using opaqueness for determining visibly, for example the methods described with reference to FIGS. 9-10, may be combined with the methods for determining visibility using $C_R$ or $C_X$ above so that an object 10 is only determined to be visible at a time point if both the conditions for $C_R$ or $C_X$ for object 10 is within the allowed limit AND the total opaqueness of the objects 9a 9b between the point of observation and the object 10 is low enough. Preferably the analysis of $C_R$ or $C_X$ and opaqueness is carried out for the same point 19 or points 19 of object 10. Preferably the colour determination and the opacity determination steps that are done by rendering software 8 (i.e. steps 101 in FIG. 4 and steps 400-403 of FIG. 10), are carried out in the same rendering cycle. The method shown in FIGS. 9-10 can, however, also be used by itself, without the methods shown in FIGS. 4-8 and this may be the subject of a future continuation or divisional patent application.

Above is described how it can be determined from a single point 19 if object 10 is visible. In a preferred embodiment it is determined if an object is visible based on a number of points 19 of the object 10. A plurality of points 19 may be selected by using detection points 22. Detection points 22 arranged in predetermined arrays 15 may be used for selecting points 19 for analysis. The object 10 is determined to be visible if a minimum number of detection points 22 qualify as described above. There may be a threshold for the number of detection points 22 that must be visible at a certain time point for the object 10 to be visible. The number of detection points 22 from object 10 that are analysed may be less than 30, more preferably less than 20, even more preferred less than 10 and most preferred less than 6. In one embodiment the number of detection points 22 is 9, and the threshold is 5. Thus, if 5 or more detection points 22 are visible; the object 10 is visible.

FIGS. 11 and 16 shows how a number of detection points 22 are superimposed on the object 10 where the detection points 22 are arranged in an array 15 by visibility detection software 13. The system 2 selects points 19 of object 10 based on the position of the detection point 22. For example, the system 2 may select the point 19 on which the detection point 22 is superimposed. FIG. 12 shows the array 15 used in FIG. 11 and FIGS. 13-14 show examples of different arrays 15 of detection points 22 for selection of points 19 of object 10 for analysis. The array 15 may be automatically placed in the centre of the advertisement object 10 by system 2, for example with the use of the centroid of the object 10. The array 15 is preferably placed on an area 20 of object 10 that is facing the user 12. FIG. 16 shows how detection points 22 superimposed on object 10. Detection points 22 selects points 19 of object 10. In FIG. 16, seven detection points 22 arranged in array 15 is used to select seven different points 19 of object 10.

With reference to FIG. 15, in step 500, an array 15 of detection points 22 in a predefined pattern is superimposed on the object 10. In step 501 visibility detection software 13 uses one or more of the methods above to detect if each of the points 19 are visible at a certain time point. In step 502 the number of detection points 22 which are visible are determined. This is preferably done by checking if the colour conditions (FIGS. 4-8) and the opacity conditions of each detection point 22 is visible as described above. Alternatively, only one of the methods is used (colour or opacity). Then the number of visible detection points 22 is used to determine of the object 10 as a whole is visible. This may be done for example as is done in steps 503-505. In step 503 it is determined if the number of visible detection points are above a predetermined threshold. If the number of visible detection points 22 is larger than the threshold, it is determined, in step 504 that the object 10 is visible. In the number of visible detection points 22 is not above the threshold, it is determined, in step 505 that the object 10 is not visible.

As described above, rendering software 8 will decide which objects 9, 10 should render to screen, with regard to clipping algorithms etc. Preferably not all objects 9, 10 in an environment 1 that are rendered by rendering software 8 are selected for analysis, but only certain objects, such as advertisement object 10. For example, objects 10 that comprise advertisements may be selected for analysis. Object 10, or placeholders for such object 10, may be tagged for analysis in advance during design of model 11. Visibility detection software 13 detects the tags and carries out the analysis for the tagged objects 10. The tag may be metadata in relation to the instructions in the model 11 for rendering the object 10 or to the placeholder in the model 11. Thus, visibility detection software 13 may detect the tag in the metadata and carry out analysis as described herein. Visibility detection software 13 may send a query to rendering software 8 if there is a tag or rendering software 8 may send information actively to visibility detection software 13 when an ad object 10 is rendered. When the placeholder is tagged, the analysis is carried out for the object 10 in the placeholder.

Determination of visibly of object 10 may be done as often as required, but preferably only when at least a part of object 10 is rendered, as determined by the rendering software 8. This has the advantage that calculations are only done for objects 10 that are known to be rendered on the display 5.

FIG. 17. Shows a method where in step 600 an object is selected for rendering. This is done by rendering software 8 as is known in the art such as clipping algorithms, ray casting, and threshold distance. If an object 9, 10 is selected for rendering, a tagged object 10 is selected for visibility check in step 601. If yes, a visibility check is carried out in step 602. This typically involves the rendering software 8 rendering an extra image which is not rendered on display, but which is used for checking visibility. This is done with a predetermined interval and is not done every rendering cycle. In step 603 it is determined that object 10 is visible. It may also be determined that the object is not visible. In step 604 the number of visibility counts is incremented by one. The final number of visibility detections may be the basis of invoicing for advertisements, for example. For an object to be visible there may be other criteria that need to be fulfilled. For example, it may be required that the object has a certain minimum size or that it has a certain angle relative to the direction of observation of the user, or is in a certain field of view relative to the angle of observation. The method and systems herein may be used to exclude object 10 from visibility counts.

Visibility determination software 13 can output the result (i.e. visible/not visible) in any suitable manner. For example, it can be reported if an advertisement banner 10 is visible or not to user. The output can be used as basis for charging for advertisements, for example.

Preferably visibility determination is preferably carried out with a predetermined minimum interval. The frequency is preferably lower than the rendering frequency and may be higher than once every 10 seconds, preferably higher than once every 5 seconds and more preferably higher than once every second. The frequency is preferably lower than twice every second.

It may be necessary to fulfil the criteria for visibility during a minimum time window for the object 10 to be classified as visible. The time window is preferably less than 10 seconds, more preferably less than 5 seconds and most preferably less than 3 seconds. Hence, visibility detection software 13 may request that rendering software 8 renders an extra "image" with a certain frequency. This image is not used for rendering on display 5 but for checking the visibility by checking the colours and the opacity values as described herein.

Again, determination of visibility is preferably done in parallel with rendering. Thereby, the rendering conditions for a certain time point does not have to be calculated two times (one for rendering on display and one for checking visibility). When checking colours, preferably, at a rendering cycle when a pseudocolor is used, the rendering software 8 briefly replaces $C_D$ with the pseudocolour $C_P$ and obtains $C_X$ using the rendering conditions for the rendering cycle. Rendering software 8 then uses $C_D$ to obtain $C_R$ in order to render object 10 on the display. Thus, in a preferred embodiment, $C_X$ is obtained before $C_R$. It is preferred that $C_X$ is obtained before $C_R$ (and not the other way around) because otherwise the processor need to keep $C_R$ in the memory until rendering on the display 5, which is disadvantageous because graphics processor typically have poor memory.

System 2 may comprise two processors of which one is a graphics processor such as a graphics card and the other is a general-purpose processor. Rendering software 8 may wholly or partly use a dedicated graphics processor such as a graphics card. Operations that require rendering, for example steps 101 of FIG. 4, step 301 of FIG. 8, steps 401-403 of FIG. 10, step 600 of FIG. 17 are preferably carried out using a dedicated graphics processor since those steps require a lot of processing power. Other procedures, such as executing visibility detection software 13, may be done on general-purpose processor.

While the invention has been described with reference to specific exemplary embodiments, the description is in general only intended to illustrate the inventive concept and should not be taken as limiting the scope of the invention. The invention is generally defined by the claims.

The invention claimed is:

1. A method for determining if an object in a three-dimensional environment rendered on a display by a computer is visible for user with a defined point of observation in the three-dimensional environment, where the three-dimensional environment is rendered in real time and in colour, and where the object is defined by at least one area with a predefined colour ($C_D$) where said area is rendered with a colour ($C_R$) that is different from the predefined colour due to rendering conditions at a defined time point, and where there is a pre-defined pseudocolour ($C_P$), where a colour is defined as colour values for each of the red (R), green (G) and blue (B) channels, and where the following steps are carried out:
  a) selecting a point on the object which point is a point in space in the three-dimensional environment,
  b) using the rendering conditions for the selected point in space at the defined time point, determine processed pseudocolour values ($C_X$) based on the pseudocolour ($C_P$),
  c) determining differences ($D_R$, $D_G$ and $D_B$) between $C_P$ and $C_X$, for each of the R, G and B channels;
  d) making a resultant vector of vectors for $D_R$, $D_G$ and $D_B$ where each of $D_R$, $D_G$ and $D_B$ is considered as a vector along a separate axis in a three-dimensional coordinate system, and
  e) using the resultant vector to determine if the object is visible, and
  wherein rendering is carried out with a rendering frequency and wherein steps a)-e) are carried out repetitively and with a frequency that is lower than the rendering frequency.

2. The method of claim 1 wherein rendering software determines the rendering conditions for the graphical environment each rendering cycle, and where the rendering conditions thus determined is used to both carry out step b) and to determine $C_R$.

3. The method of claim 2 rendering conditions for the graphical environment is used to first to carry out step b) and then to determine $C_R$.

4. The method of claim 1 where step e) is carried out by determining that an object is visible if the resultant vector is no longer than a predetermined threshold T.

5. The method of claim 1 where $D_R$, $D_G$ and $D_B$ are determined as the absolute values of the difference between $C_P$ and $C_X$ for each of the colour channels.

6. The method of claim 1 where the pseudocolour is chosen so that that the R, G and B values of the pseudocolour has an intensity larger than the threshold, but smaller than the maximum value minus the threshold value.

7. The method of claim 1 where an array of detection points in an predefined pattern is superimposed on the object, and steps a) to e) are carried out for each of the points on which the detection points are superimposed, and where the object is considered to be visible of a minimum number of points are visible.

8. The method of claim 1 where each area in the three-dimensional environment is assigned a value for opacity (alpha value), and the additional steps are carried out for the selected point of the object:
   a) identifying all points for rendered objects along a straight line between the point of observation and the selected point,
   b) determining the opacity values (alpha value) for each of said points identified in step b),
   c) adding the opacity values of said points, and
   d) using the value of step c) to determine if the object is visible.

9. A computer system comprising a model of a three-dimensional environment, a display, rendering software and visibility detection software, where the rendering software is configured to render the three-dimensional environment in real time and in colour on the display,
   the visibility detection software being configured to determine if an object in the three-dimensional environment is visible for a user, where said user has a defined point of observation in the three-dimensional environment, where the object is defined in the model with at least one area with a predefined colour ($C_D$) where the area is rendered with a colour ($C_R$) that is different from the predefined colour due to rendering conditions at a defined time point, and where there is a predefined pseudo colour, where a colour is defined as colour values for each of the red (R), green (G) and blue (B) channels, and where the software is configured to
   a) select a point on the object, which point is a point in space in the three-dimensional environment,
   b) using the rendering conditions for the point in space at the defined time point, calculate processed pseudocolour values ($C_X$) based on the pseudocolour ($C_P$),
   c) determine differences ($D_R$, $D_G$ and $D_B$) between $C_P$ and $C_X$, for each of R, G and B channels;
   d) make a resultant vector of vectors for $D_R$, $D_G$ and $D_B$ where each of $D_R$, $D_G$ and $D_B$ is considered as a vector along a separate axis in a three-dimensional coordinate system, and
   e) use the resultant vector to determine if the object is visible, and
   wherein rendering is carried out with a rendering frequency and wherein a)-e) are carried out repetitively and with a frequency that is lower than the rendering frequency.

* * * * *